3,349,111
PROCESS FOR THE PREPARATION OF 3,5-DIBROMO-4-HYDROXYBENZONITRILE
Raymond W. Luckenbaugh, Wilmington, Del., assignor to E. I. du Pont de Nemours and Company, Wilmington, Del., a corporation of Delaware
No Drawing. Filed Jan. 14, 1964, Ser. No. 337,530
5 Claims. (Cl. 260—465)

This invention relates to the preparation of 3,5-dibromo-4-hydroxybenzonitrile.

More specifically, this invention refers to an improved process for producing 3,5-dibromo-4-hydroxybenzonitrile by reacting one mole of an aqueous suspension of p-hydroxybenzonitrile with 0 to 3.5 moles of aqueous sodium hydroxide followed by the addition of 1 to 1.1 moles of bromine and thereafter followed by the addition of one mole of chlorine.

In the known process for producing 3,5-dibromo-4-hydroxybenzonitrile, E. Muller et al., Chem. Ber. 92, 2278 (1959), it is necessary to dissolve the starting material in methanol and glacial acetic acid and then treat the material with 2 moles of bromine. This process is laborious and requires an unnecessary step. The product must be poured into an aqueous methanolic solution of $NaHSO_3$. This adds to the cost of the process.

I have discovered a quick and easy method for producing the desired compound at high yield and at low cost.

My process involves dissolving a quantity of p-hydroxybenzonitrile in water at the rate of approximately 20 pounds of p-hydroxybenzonitrile per 100 pounds of water. If the aqueous suspension is too thick additional water can be added. In one of two alternative routes the salt of p-hydroxybenzonitrile is produced by adding approximately 3 to 3.5 moles of aqueous sodium hydroxide, potassium hydroxide, lithium hydroxide, sodium carbonate, potassium carbonate, lithium carbonate or other like base.

The temperature is maintained at 15 to 85° C. during the reaction. Approximately one mole of bromine is added gradually to the aqueous suspension while stirring the solution. After all the bromine is reacted approximately one mole of gaseous chlorine is added gradually. The reaction mixture is acidified gradually with cooling using sufficient acid such as hydrochloric acid to obtain a pH of 1 to 3. After acidification, the reaction mixture is further cooled and filtered. The solid produced is washed with water until salt free and thereafter is air-dried to give essentially a quantitative yield of high technical grade quality 3,5-dibromo-4-hydroxybenzonitrile.

Sodium hydroxide is highly preferred for producing the salt.

In the alternative route a p-hydroxybenzonitrile is used in an aqueous suspension without addition of sodium hydroxide or other base. In this process p-hydroxybenzonitrile is reacted directly in the aqueous solution with 1.1 moles of bromine. The reaction temperature is allowed to rise slowly to about 35° C. where it is maintained by external cooling. After all the bromine has reacted one mole of gaseous chloride is sparged gradually while stirring the reaction mixture. The reaction product is filtered, washed with water until acid free and then air-dried. Again the solid is essentially a quantitative yield of 3,5-dibromo-4-hydroxybenzonitrile of high technical grade quality.

It should be noted that it is important to maintain the sodium salt of p-hydroxybenzonitrile in an aqueous suspension at all times. The exact viscosity of the suspension can be determined by practical considerations. As mentioned above if the viscosity is too high more water can be added without disturbing the process.

The compound produced is an outstanding herbicide.

In order to describe this invention more fully the following additional examples are provided.

Example 1

A total of 119 parts by weight of p-hydroxybenzonitrile is dissolved in 1200 parts by weight of water containing 122 parts by weight of sodium hydroxide. A total of 160 parts by weight of bromine is added gradually to the above while stirring the solution and maintaining the temperature of the reaction by external cooling between 30 to 40° C. After all the bromine is reacted, a total of 71 parts by weight of chlorine is added gradually, maintaining the temperature range between 30 to 40° C.

The reaction mixture is acidified gradually with cooling using sufficient hydrochloric acid to obtain a pH of 1.0. After acidification, the reaction mixture is cooled and filtered. The solid is washed with water until salt free and thereafter air-dried to give an essentially quantitative yield of high technical grade quality 3,5-dibromo-4-hydroxybenzonitrile.

Example 2

Bromine, 160 parts by weight, is added gradually to a stirred mixture consisting of 119 parts by weight of p-hydroxybenzonitrile and 1200 parts by weight of water. The reaction temperature is allowed to rise to 35° C. but then is maintained to about 35° C. by external cooling. After all the bromine has reacted (color discharged) a total of 71 parts by weight of chlorine gas is sparged in gradually while stirring the reaction mixture. The entire mixture is stirred for an additional two hours to ensure complete reaction. The solid is filtered, washed with water until acid free, and then air-dried. This solid is an essentially quantitative yield of 3,5-dibromo-4-hydroxybenzonitrile of high technical grade quality.

The invention claimed is:

1. A process for producing 3,5-dibromo-4-hydroxybenzonitrile comprising reaction one mole of an aqueous suspension of p-hydroxybenzonitrile with 0 to 3.5 moles of aqueous alkali metal hydroxide or aqueous alkali metal carbonate, adding to the resulting reaction mixture 1 to 1.1 moles of bromine, after all said bromine has reacted adding to the reaction mixture one mole of chlorine, acidifying the reaction mixture and filtering to obtain the desired product.

2. A process for producing 3,5-dibromo-4-hydroxybenzonitrile comprising reacting one mole of an aqueous suspension of p-hydroxybenzonitrile with 1 to 1.1 moles of bromine and after all said bromine has reacted adding to the resulting reaction mixture one mole of chlorine.

3. A process for producing 3,5-dibromo-4-hydroxybenzonitrile comprising reacting one mole of an aqueous suspension of p-hydroxybenzonitrile with 1 to 1.1 moles of bromine, after all said bromine has reacted adding to the resulting reaction mixture one mole of chlorine and filtering to obtain the desired solid product, said process being carried out at a temperature of from 15 to 85° C.

4. A process for producing 3,5-dibromo-4-hydroxybenzonitrile comprising reacting one mole of an aqueous suspension of p-hydroxybenzonitrile with 3.0 to 3.5 moles of aqueous alkali metal hydroxide or aqueous alkali metal carbonate, adding to the resulting reaction mixture 1 to 1.1 moles of bromine, after all said bromine has reacted adding to the reaction mixture one mole of chlorine, acidifying the reaction mixture and filtering to obtain the desired product.

5. A process for producing 3,5-dibromo-4-hydroxybenzonitrile comprising reacting one mole of an aqueous suspension of p-hydroxybenzonitrile with 3.0 to 3.5 moles of aqueous sodium hydroxide, adding to the resulting reaction mixture 1 to 1.1 moles of bromine, after all said bromine has reacted adding to the reaction mixture one mole of chlorine, adjusting the reaction mixture to a pH of 1 to 3 with hydrochloric acid and filtering to obtain the desired solid product, said process being carried out at a temperature of from 15 to 85° C.

References Cited

UNITED STATES PATENTS 2,394,268   2/1946   Spencer _____ 260—515
2,607,802   8/1952   Britton et al. _____ 260—544

OTHER REFERENCES

E. Muller et al.: Chemical Abstracts, vol. 54. 2224–2226 (1963).

CHARLES B. PARKER, *Primary Examiner.*

JOSEPH P. BRUST, *Examiner.*

D. H. TORRENCE, *Assistant Examiner.*